(12) United States Patent
Chan et al.

(10) Patent No.: US 8,484,391 B2
(45) Date of Patent: Jul. 9, 2013

(54) CONFIGURABLE BUFFER ALLOCATION FOR MULTI-FORMAT VIDEO PROCESSING

(75) Inventors: Hiu-Fai R. Chan, Rancho Cordova, CA (US); Scott W. Cheng, Folsom, CA (US); Hong Jiang, El Dorado, CA (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 13/163,969

(22) Filed: Jun. 20, 2011

(65) Prior Publication Data

US 2012/0324129 A1  Dec. 20, 2012

(51) Int. Cl.
*G06F 3/00* (2006.01)
*G06F 5/00* (2006.01)
*G06F 12/00* (2006.01)
*G06F 13/00* (2006.01)
*G06F 13/28* (2006.01)

(52) U.S. Cl.
USPC ................ 710/52; 710/56; 711/130; 711/147

(58) Field of Classification Search
None
See application file for complete search history.

(56) References Cited

U.S. PATENT DOCUMENTS

| 6,229,850 | B1* | 5/2001 | Linzer et al. ............. 375/240.11 |
| 7,206,904 | B2* | 4/2007 | Gooch .......................... 711/150 |
| 8,179,964 | B1* | 5/2012 | Masterson et al. ........ 375/240.12 |
| 2005/0253858 | A1* | 11/2005 | Ohkami et al. ............... 345/531 |
| 2006/0251064 | A1* | 11/2006 | Yeh et al. ....................... 370/389 |
| 2007/0092004 | A1* | 4/2007 | Ho ............................ 375/240.12 |
| 2009/0018683 | A1* | 1/2009 | Gibbs et al. ..................... 700/94 |
| 2009/0274209 | A1* | 11/2009 | Garg et al. ............... 375/240.03 |

OTHER PUBLICATIONS

SMPTE Standard: VC-1 Compressed Video Bitstream Format and Decoding Process, SMPTE 421M-2006, The Society of Motion Picture and Television Engineers (SMPTE), Feb. 24, 2006, 493 pages.
Liu, et al., "Design of an H.264/AVC Decoder with Memory Hierarchy and Line-Pixel-Lookahead", Journal of VLSI Signal Processing, Accepted on Jun. 13, 2007, 12 pages.

\* cited by examiner

*Primary Examiner* — Kris Rhu
(74) *Attorney, Agent, or Firm* — Jim Lynch Law Firm; James J. Lynch

(57) ABSTRACT

Systems and methods are described including dynamically configuring a shared buffer to support processing of at least two video read streams associated with different video codec formats. The methods may include determining a buffer write address within the shared buffer in response to a memory request associated with one read stream, and determining a different buffer write address within the shared buffer in response to a memory request associated with the other read stream.

24 Claims, 10 Drawing Sheets

CONFIGURABLE BUFFER ALLOCATION FOR MULTI-FORMAT VIDEO PROCESSING

BACKGROUND

Various different video codecs may be used to compress video images. In general, video codecs make frequent use of memory resources when compressing or decompressing image data. Different video codecs, such as advanced video coding (AVC) codecs or the Society of Motion Picture and Television Engineers (SMPTE) codecs, for example, often have different and/or unique types of memory read or write requests such as bitstream, bit-plane surface, byte stream decoder (BSD) rowstore, pixel data requests, and so forth. Conventional video decoder designs may employ multiple fixed-size buffer memories to support processing of video codec read streams generated by particular type(s) of video codecs. For example, an AVC decoder design may require three separate similarly sized rowstore buffers for read stream processing, whereas, on the other hand, an SMPTE VC-1 decoder design may require one medium-sized rowstore buffer, one large differential motion vector (DMV) buffer, and one small bit-plane buffer.

Conventional video decoder designs typically employ large internal caches and/or separate predefined fixed size buffers per read stream. However, such approaches can be very area expensive and/or subject to high power consumption. In addition, most conventional video hardware acceleration decoder designs do not have sufficient area to include a large internal cache to store temporary data. Hence, most designs use pre-fetching logic and multiple small buffers to hide long memory latency of read requests from external memory.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
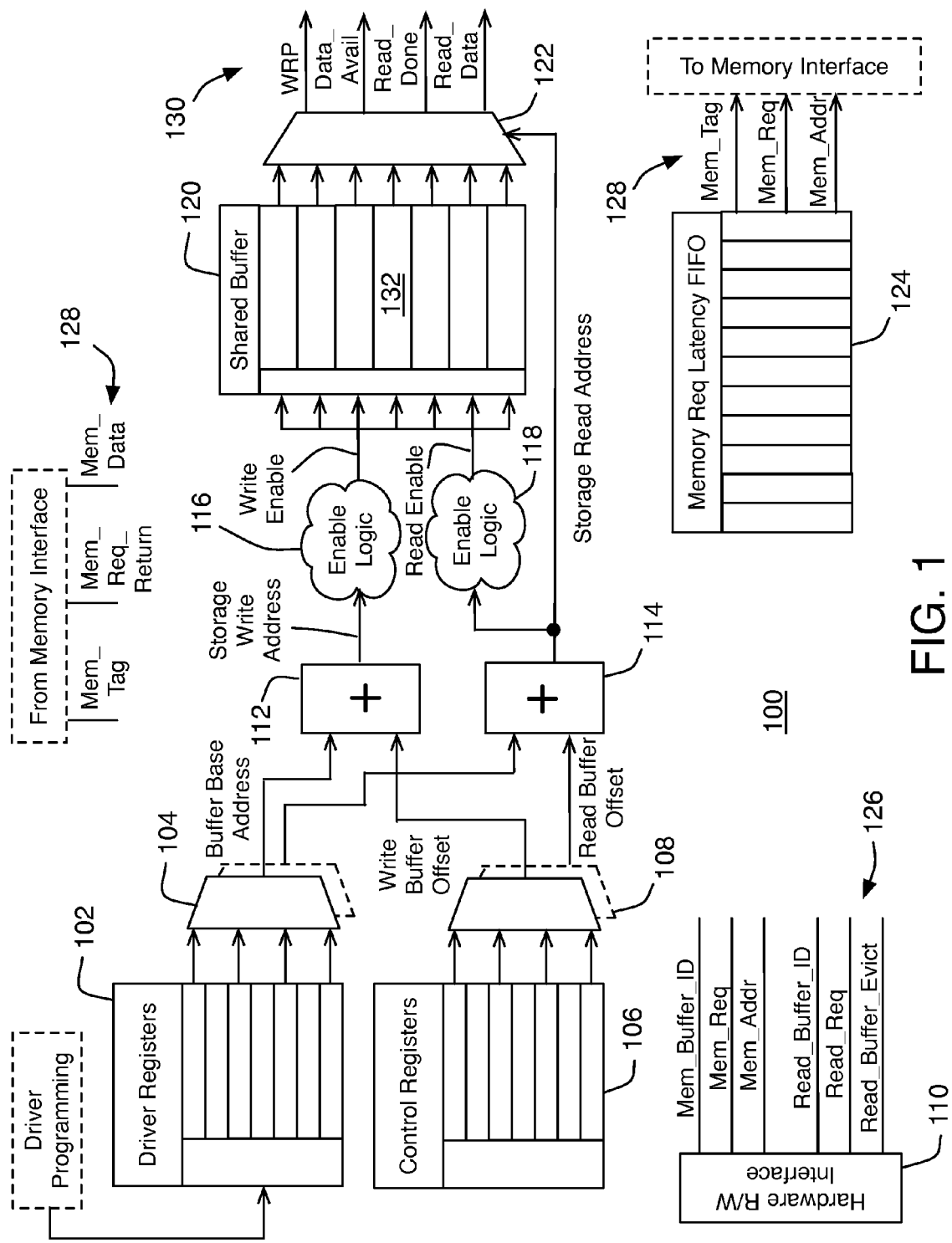
FIG. 1 is an illustrative diagram of an example system.

One or more embodiments are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

FIG. 1 illustrates an example system 100 in accordance with the present disclosure. Devices and/or systems in accordance with the present disclosure, such as example system 100 may dynamically change pre-fetch buffer resource allocation in a media pipeline to meet different video codec processing needs. System 100 includes driver registers 102 and corresponding multiplexer(s) 104, control registers 106 and corresponding multiplexer(s) 108, a hardware read/write (R/W) interface 110, addition logic 112 and 114, enable logic 116 and 118, shared buffer memory 120 and associated multiplexer 122, and a memory request latency first-in-first-out (FIFO) 124. R/W interface 110 may receive various signals 126 from hardware external to system 100 and may provide those signals to various components of system 100 as will be described in greater detail below. Further, system 100 may include various signals 128 provided to and/or received from a memory interface (not shown) coupled to memory (not shown) external to system 100 as will be described in greater detail below. In addition, system 100 may include various signals 130 that may be provided to hardware external to system 100 as will be described in greater detail below.

In accordance with the present disclosure, shared buffer 120 may be a pre-fetch buffer that may be logically partitioned into multiple buffer regions 132 on a dynamic basis to support video decoder resource allocation. To specify partitioning of buffer 120, driver registers 102 may store configuration data including the starting location of each region 132 within shared buffer 120. The size or extent of any particular buffer region 132 may be determined by subtracting the starting location of a next buffer region with a current buffer region. Configuration data stored in registers 102 may be updated or modified as needed to provide dynamic reallocation of regions 132. As a result, although illustrated in FIG. 1 as having the seven (7) regions 132 of similar relative size, the numbers and/or relative sizes of regions 132 may change as shared buffer 120 is dynamically configured in accordance with the present disclosure as will be described in greater detail below.

In various implementations, at least a portion of a low-level on-chip cache memory may implement shared buffer 120. For example, shared buffer 120 may be provided by a portion of a low-level cache memory where the overall size of buffer 120 expressed in terms, for example, of total memory addresses or locations of the cache memory, may change dynamically as needed and as specified by the contents of registers 102. In general, shared buffer 120 may be implemented by any type of memory including static random access memory (SRAM), dynamic random access memory (DRAM), flash memory, etc.

Control registers 106 may store all internal registers for system 100. In various implementations, control registers 106 may hold read and write offsets associated with the starting location of each buffer region 132. The read and/or write offsets may start with a value of zero and may increment in response to a read request or a write request. Shared buffer 120 may be treated as circular storage and read and/or write offsets may wrap back to zero (using wrap-around logic not depicted in FIG. 1) when they reach the end of a corresponding region 132. Shared buffer 120 may act as the main pre-fetch storage for memory data used in video processing. FIFO 124 may be used to store outstanding requests to memory external to system 100.

In accordance with the present disclosure, video decoder architectures may employ a single control mechanism such as system 100 to read and/or write video data to a shared buffer memory. Further, software drivers interfacing with system 100 through driver registers 102 may be allowed to adjust the size of buffer 120 and/or the number and sizes of regions 132 according to usage model. In addition, shared buffer 120 may be reconfigured to compensate for different memory latency per stream.

In accordance with the present disclosure, software drivers may be used to initially program the number and/or sizes of buffer regions 132. The programmed configuration of shared buffer 120 may be maintained until all outstanding memory requests are processed. Further, hardware may be allowed to make memory requests and to read data from each buffer region 132 independently.

Various components of system 100 may be implemented in software, firmware, and/or hardware and/or any combination thereof. For example, various components of system 100 may be provided, at least in part, by hardware of a computing system-on-a-chip (SoC) such as may be found in a consumer electronics (CE) system. For instance, in one non-limiting example, system 100 may be implemented in a CE device such as a set-top box.

Figure 2:
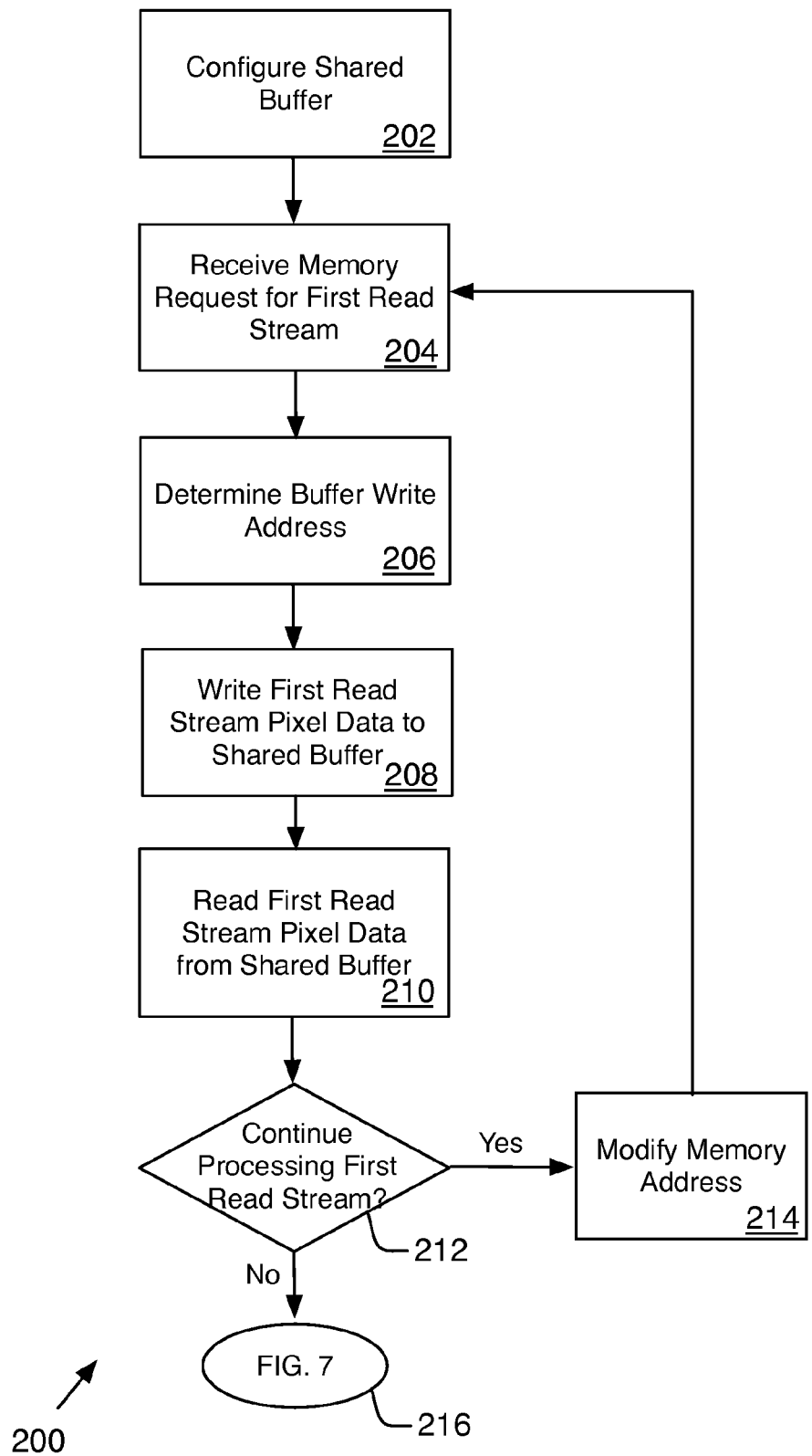
FIG. 2 illustrates an example process.

FIG. 2 illustrates a flow diagram of an example process 200 for memory request processing according to various implementations of the present disclosure. Process 200 may include one or more operations, functions or actions as illustrated by one or more of blocks 202, 204, 206, 208, 210, 212, 214, and 216 of FIG. 2. By way of non-limiting example, process 200 will be described herein with reference to example system 100 of FIG. 1. Process 200 may begin at block 202.

At block 202 a shared buffer may be configured. In various implementations, for example, shared buffer 120 may be configured by logically partitioning buffer 120 into buffer regions 132 in response to configuration data held in registers 102 where that configuration data may have been provided by drivers associated with different decoder processes. In accordance with the present disclosure, block 202 may include partitioning a shared buffer into different regions to allow for multi-format video processing.

Figure 3:
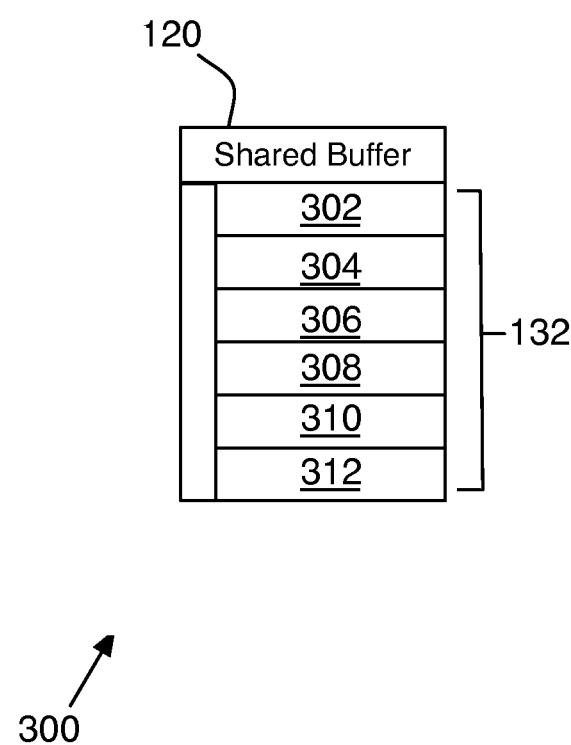
FIG. 3 illustrates an example shared buffer configuration.

FIG. 3 illustrates an example configuration 300 of shared buffer 120 configured at block 202 into six buffer regions 302-312. As noted above, an overall size of shared buffer 120 may be determined dynamically depending on the number of regions 132 and the sizes of those regions 132 as specified by the configuration data held in driver registers 102.

In the example configuration 300, configuration data held in registers 102 may specify the size of buffer regions 302, 304 and 306 such that those regions may be used for video processing according to one video format or standard, while specifying the size of buffer regions 308, 310 and 312 such that those regions may be used for video processing according to another video format or standard. For instance, example configuration 300 may provide three separate buffers 302, 304 and 306 for use by an AVC decoder when undertaking rowstore operations, while configuration 300 may also provide a rowstore buffer 308, a differential motion vector (DMV) buffer 310, and a bit-plane buffer 312 for use by a VC-1 decoder process.

While configuration 300 as described herein provides different buffer regions for use by processes consistent with two different video processing standards, a shared buffer in accordance with the present disclosure may be configured to provide any number and/or relative sizes of buffer regions for use by any number of video processing formats or standards. Further, while configuration 300 illustrates buffer regions 302-312 having approximately equal size, those of skill in the art will recognize that configuration 300 is merely representative and that the relative sizes and numbers of regions 132 may be differently arranged in various implementations. For example, buffers 302, 304 and 306 configured for use by an AVC decoder during rowstore operations may have approximately equal sizes, while DMV buffer 310 may be larger than any of buffers 302, 304 or 306, and bit-plane buffer 312 may be smaller than any of buffers 302, 304 or 306.

Further, in various implementations, block 202 may involve configuring a shared buffer for processing bitstream data corresponding to one or more video pictures or frames, or for a portion of video frame such as a video picture slice or the like. For instance, block 202 may involve configuring shared buffer 120 for processing a read stream of data corresponding to at least a portion, such as a slice, of a frame of video stored in external memory where process 200 may involve successive instances of requesting access to external memory to write different portions of that frame data into buffer 120 as will be explained in greater detail below. At block 204 a memory request for a first read stream may be received.

Figure 4:
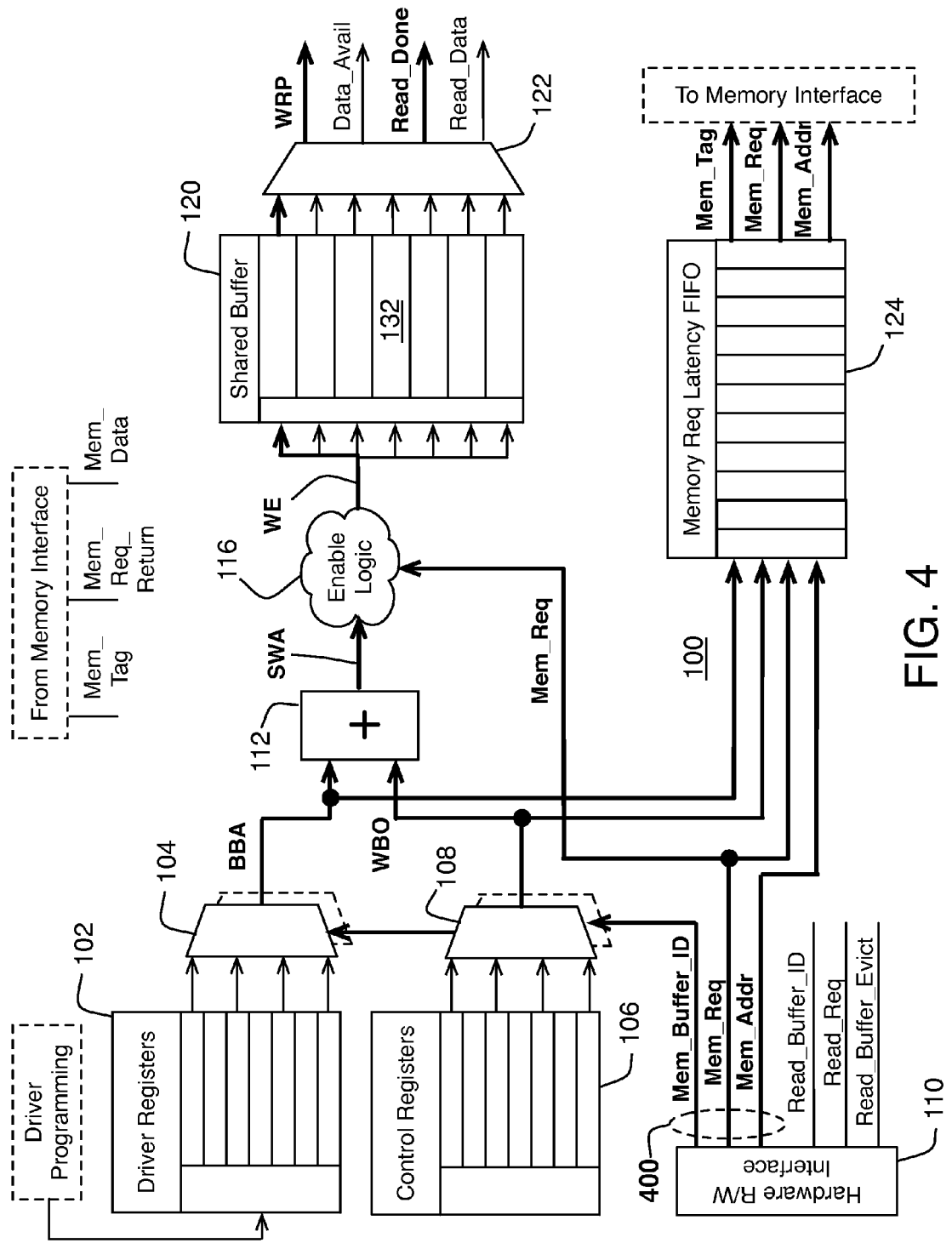
FIG. 4 illustrates an example system of FIG. 1 in the context of a memory request.

FIG. 4 illustrates example system 100 in the context of memory request processing of block 204 in accordance with various implementations of the present disclosure. As shown in FIG. 4, R/W interface 110 may receive a memory request 400 seeking access to external memory for the purpose of reading data such as pixel values from that memory. For example, an AVC decoder may provide memory request 400 at block 202 where memory request 400 may be part of a read stream process seeking to read pixel data from external memory. For example, block 204 may be undertaken during a rowstore operation executed by an AVC decoder process. As used herein, pixel data may refer to any form of data used in video decoder processing such as, but not limited to: macroblock, block and/or sub-block data values (e.g., pixel YUV values), motion vector data values (e.g., X and Y offsets), intra-block and/or inter-block data values (e.g., quantized AC and/or quantized DC coefficients); and so forth.

Referring again to example system 100 as shown in FIGS. 1 and 4, the memory request 400 received at block 204 may include the signals Memory Request (Mem_Req), Memory buffer identification (Mem_Buffer_ID) and Memory Address (Mem_Addr). Interface 110 may provide the Mem_Req signal to both FIFO 124 and enable logic 116. The signal Mem_Addr may specify the address in external memory that the memory request is directed to and may be provided to FIFO 124. The signal Mem_Buffer_ID may specify which buffer region 132 is to be used in response to the memory request and may be supplied by R/W interface 110 to multiplexer(s) 104 and 108 associated with driver registers 102 and control registers 106, respectively. In various implementations, hardware that issues memory request 400 at block 204 may first check a Read Done signal provided by as one of signals 130.

At block 206, a buffer write address may be determined. As shown in FIG. 4, the Mem_Buffer_ID signal provided to multiplexer(s) 104 and 108 at block 204 may, in combination with data stored in respective registers 102 and 106, be used to select a Write Buffer Offset (WBO) signal and a Buffer Base Address (BBA) signal. The WBO and BBA signals may be provided to addition logic 112 which may logically combine the WBO and BBA signals to form a Storage Write Address (SWA) signal. In response to both the SWA signal and the Mem_Req signal, enable logic 116 may then provide shared buffer 120 with a write enable (WE) signal.

The WE signal may specify a location or address within a particular region 132 of buffer 120 that has been designated for temporarily storing the pixel data sought by the memory request received at block 204. For example, when a decoder undertakes a first instance of a read request at block 204, the SWA signal may indicate an initial or starting address within a region 132. Hence, the WBO signal may have an initial value of zero (0). For example, referring also to FIG. 3, an AVC decoder may provide the read request at block 204 with a Mem_Buffer_ID specifying, for example, rowstore buffer 302 as the target buffer for the memory request. The SWA signal may specify a location or address within rowstore buffer 302 where the exact location in buffer 302 depends on the value of the WBO signal.

In response to receiving the WE signal, shared buffer 120 may assert a Write Request in Progress (WRP) signal indicating that system 100 has received and begun responding to a memory request. In addition, in response to receiving the memory request at block 204, system 100 may combine the WBO and BBA signals to form a Mem_Tag signal that may be used to determine the write location or address within the region 132 indicated by the SWA signal when data is returned from memory as will be explained in further detail below. The Mem_Tag, Mem_Req and Mem_Addr signals may be stored in FIFO 124 and may subsequently be provided to the memory interface. At block 208, pixel data for the first read stream may be written to the shared buffer.

Figure 5:
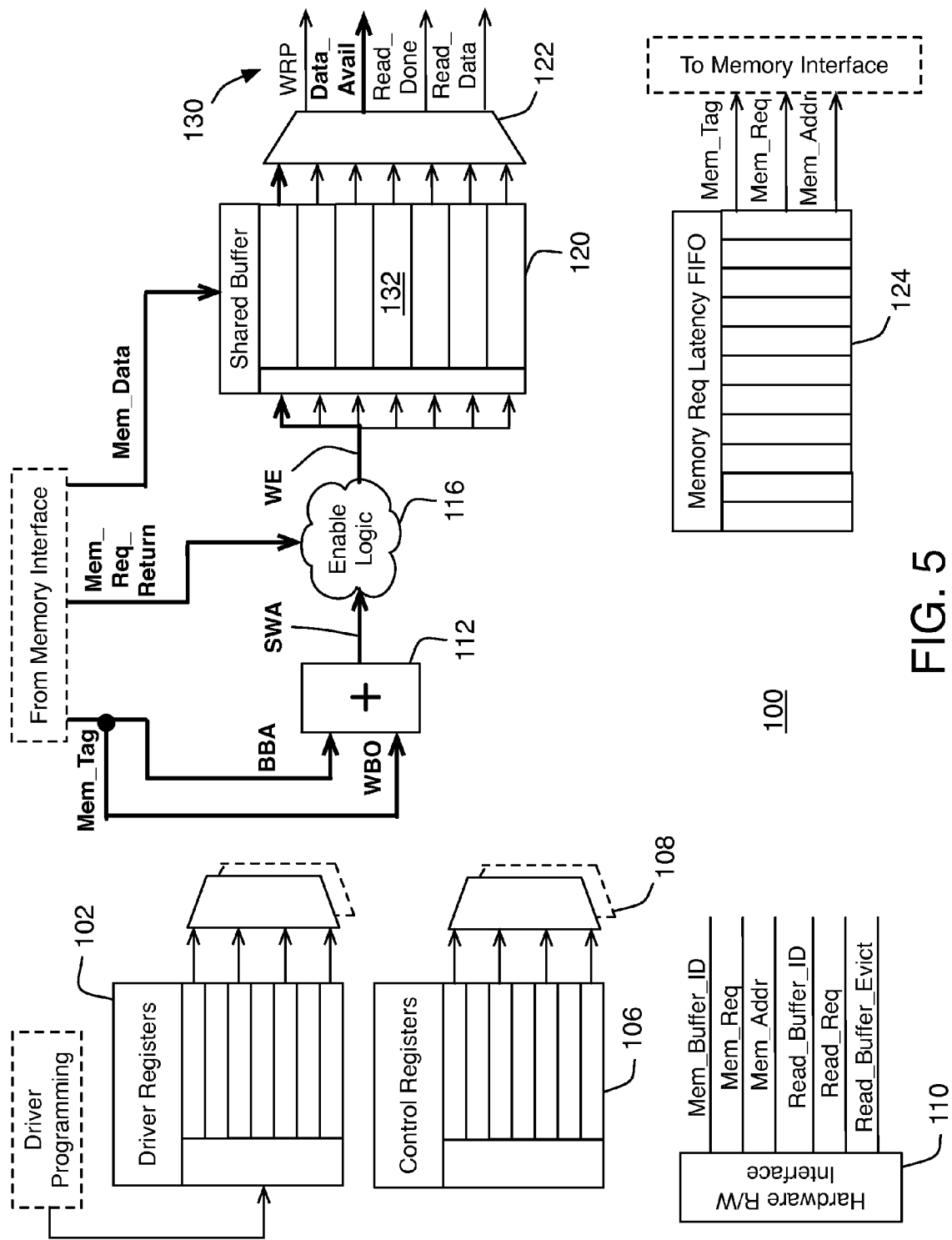
FIG. 5 illustrates an example system of FIG. 1 in the context of a data return from memory.

FIG. 5 illustrates system 100 in the context of data return processing at block 208 in accordance with various implementations of the present disclosure. Referring to both FIGS. 2 and 5, in various implementations, block 208 may involve the external memory using the Mem_Addr signal to locate the pixel data to be read. For example, the Mem_Addr signal may indicate a row of pixel values stored in external memory.

External memory may then provide, via the memory interface of system 100, the pixel data as a Mem_Data signal to shared buffer 120. The BBA and WBO components of the Mem_Tag signal also provided by external memory may be added by logic 112 to provide the SWA signal to enable logic 116. Logic 116 may then, in response to a Memory Request Return (Mem_Req_Return) signal, provide a WE signal to buffer 120 causing buffer 120 to store the pixel data (e.g., corresponding to the Mem_Data signal) at the specific address within the portion 132 indicated by the SWA signal. Continuing the example from above, if the SWA signal specifies an address within rowstore buffer 302, then block 208 may result in pixel data being stored at that location during rowstore processing by an AVC decoder process. For example, a row of pixel data may be stored beginning at the location indicated by the SWA signal.

Once pixel data has been written to the shared buffer, system 100 may assert a Data Available (Data_Avail) signal indicating to hardware that the requested pixel data is available to be read from buffer 120. Further, when writing the read data at block 208, system 100 may also increment the WBO value so that any subsequent memory request may write data to a next location within the particular region 132 of buffer 120. Process 200 may continue with reading of the first read stream pixel data from the shared buffer at block 210.

Figure 6:
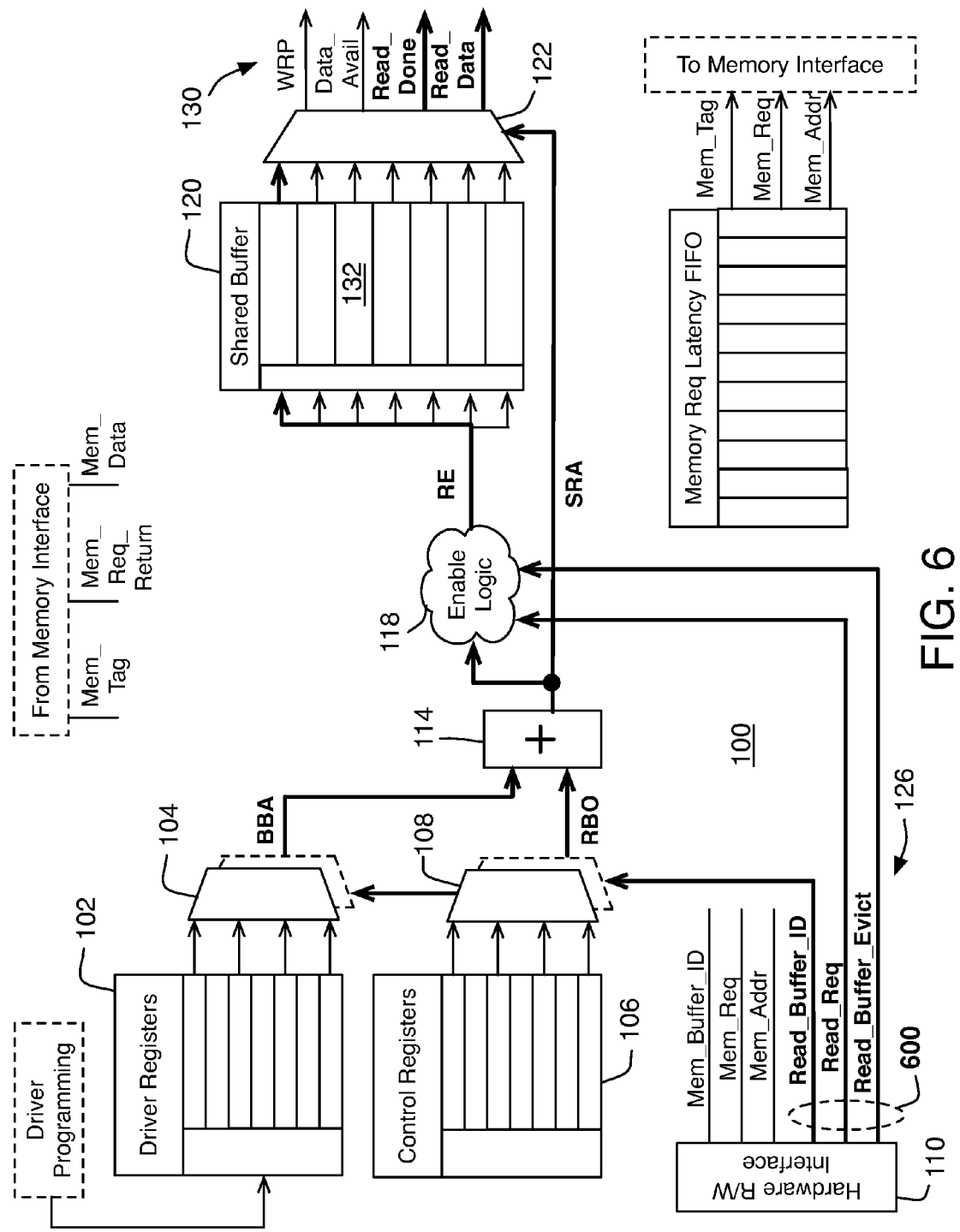
FIG. 6 illustrates an example system of FIG. 1 in the context of a data read.

FIG. 6 illustrates example system 100 in the context of read request processing at block 210 in accordance with various implementations of the present disclosure. As shown in FIG. 6, block 210 may include R/W interface 110 receiving a read request 600 to access the pixel data stored in the shared buffer as a result of block 208. For example, an AVC decoding process may provide read request 600 at block 210 in the process of executing a rowstore operation.

Read request 600 may include a Read Buffer Identification (Read_Buffer_ID) signal, a Read Request (Read_Req) signal, and a Read_Buffer_Evict signal. The Read_Buffer_ID signal may be provided to multiplexer 104 to provide a corresponding BBA signal, and to multiplexer 108 to provide a Read Buffer Offset (RBO) signal. Logic 114 may then add the RBO signal to the BBA signal to generate a Storage Read Address (SRA) signal indicating the specific location within the particular region 132 of buffer 120 that stores the pixel data to be read at block 210. Continuing the example from above, if the SRA signal specifies the address within rowstore buffer 302 where pixel data was written to at block 208, then block 210 may result in a that pixel data being read from that location during rowstore processing by an AVC decoder. For example, block 210 may involve a row of pixel values being read from shared buffer 120.

In some implementations, block 210 may involve hardware not setting the Read_Buffer_Evict signal while setting the Read_Req signal so that the hardware may check the status of the location indicated by the SRA signal. If, in doing so, the hardware detects that a Read_Data signal is set indicating that the data is available to be read at that location, the hardware may then continue implementing block 210 by also setting both the Read_Req signal and the Read_Buffer_Evict to read the data from shared buffer 120 by accessing the Read_Data signal.

Enable logic 118 may respond to the SRA signal, the Read_Req signal and the Read_Buffer_Evict signal by providing a Read Enable (RE) signal to buffer 120. In conjunction with the RE signal, the SRA may be provided to multiplexer 122 causing the stored data to appear as the Read_Data signal. Further, when providing the read data at block 210, system 100 may set the Read_Done signal indicating that the data has no further use and may also increment the RBO value stored in register 106 so that any subsequent read request may be to a next location within the particular region 132 of buffer 120.

Returning to FIG. 2, process 200 may continue at block 212 where a determination may be made as to whether processing of the first read stream is to continue. For example, in various implementations, a video decoder may have undertaken a first iteration of blocks 204-210 as an initial operation of obtaining pixel data for a read stream process. The video decoder may then undertake one or more additional iterations of blocks 204-210 to obtain additional portion(s) of pixel data for the read stream process. Hence, if it is determined at block 212 that further processing of the first read stream is to continue, then the decoder may act to modify the memory address at block 214 (e.g., by incrementing the Mem_Addr signal value) before undertaking another iteration of blocks 204-212. In various implementations, a video decoder process may continue looping through blocks 204-214 until, at a final instance of block 212, the decoder determines that processing for the first read stream has ended. For example, and AVC decoder undertaking process 200 may determine at a final instance of block 212 that processing of a first read stream has ended when, for instance, a rowstore operation corresponding to the first read stream process has obtained a desired quantity of pixel data from external memory. On the other hand, if, at block 212, it is determined that processing of the first read stream is not to continue, then process 200 may continue at block 216 with further operations, functions or actions.

Figure 7:
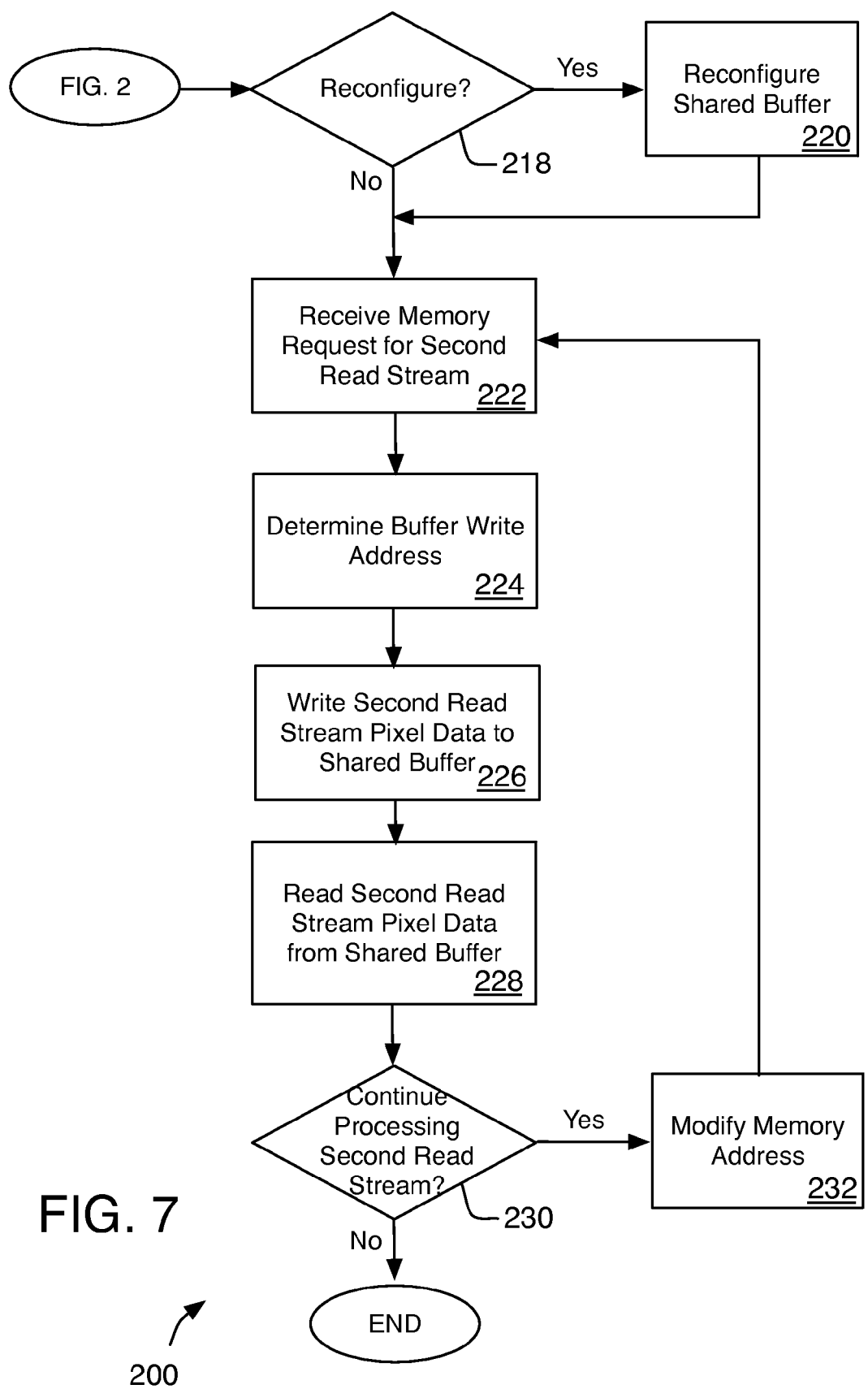
FIG. 7 illustrates additional portions of the example process of FIG. 2.

FIG. 7 illustrates further portions of example process 200 for memory request processing are illustrated according to various implementations of the present disclosure. Process 200 may include one or more additional operations, functions or actions as illustrated by one or more of blocks 218, 220, 222, 224, 226, 228, 230, and 232. By way of non-limiting example, process 200 as illustrated in FIG. 7 will again be described herein with reference to example system 100 of FIG. 1. Process 200 may continue at block 218.

At block 218 a determination may be made as to whether the shared buffer should be reconfigured. In various implementations, block 218 may involve a determination of whether the shared buffer 120 needs to be reconfigured to undertake processing of a new or second read stream such as another video processing read stream. For example, while read stream processing for a first read stream conforming to a first video format or standard, such as a read stream generated by an AVC decoder, may be undertaken at blocks 204-214 of FIG. 2, block 218 may involve determining whether the shared buffer 120 needs to be reconfigured to undertake processing of a second read stream associated with another video format or standard, such as might be undertaken by a VC-1 decoder, for example.

If, at block 218, it is determined that reconfiguration should not be undertaken, then process 200 may continue with the receipt of a memory request for a second read stream (block 222), the determination of a buffer write address for that memory request (block 224), the writing of pixel data to the shared buffer for that second read stream (block 226), and the reading of that pixel data from the shared buffer at block 228. Blocks 222, 224, 226 and 228 may be undertaken in a similar manner as described above for blocks 204, 206, 208 and 210, respectively, of FIG. 2.

In various implementations, it may be determined that reconfiguration should not be undertaken at block 218 when the shared buffer was configured at block 202 (FIG. 2) in a manner that allows processing of the second read stream at blocks 222-228 of FIG. 7. For instance, referring to the example configuration 300 of FIG. 3, if the second read stream is a VC-1 decoder read stream, then shared buffer 120, which includes regions 308, 310 and 312 that have been configured to be suitable for VC-1 decoder processes at block 202, may be suitably configured for undertaking processing of the second read stream at blocks 222-228 of FIG. 7 without reconfiguration.

If, on the other hand, it is determined that reconfiguration should be undertaken at block 218, then process 200 may continue at block 220 with reconfiguration of the shared buffer. For example, it may be determined at block 218 that the shared buffer 120 is not configured in a manner that would facilitate processing of a second read stream. In various implementations, block 220 may be undertaken in response to configuration data placed in registers 102 by software driver(s) associated with one or more video decoder processes. For example, a software driver associated with a VC-1 decoder process undertaking processing of the second read stream may provide configuration data to registers 102. System 100 may then use that configuration data associated with the second read stream to reconfigure shared buffer 120. For example, the shared buffer 120 may be dynamically reconfigured at block 220 in response to system 100 being invoked to decode a video bitstream encoded according to a different format than the format of the video bitstream processed at blocks 204-214 of FIG. 2.

Figure 8:
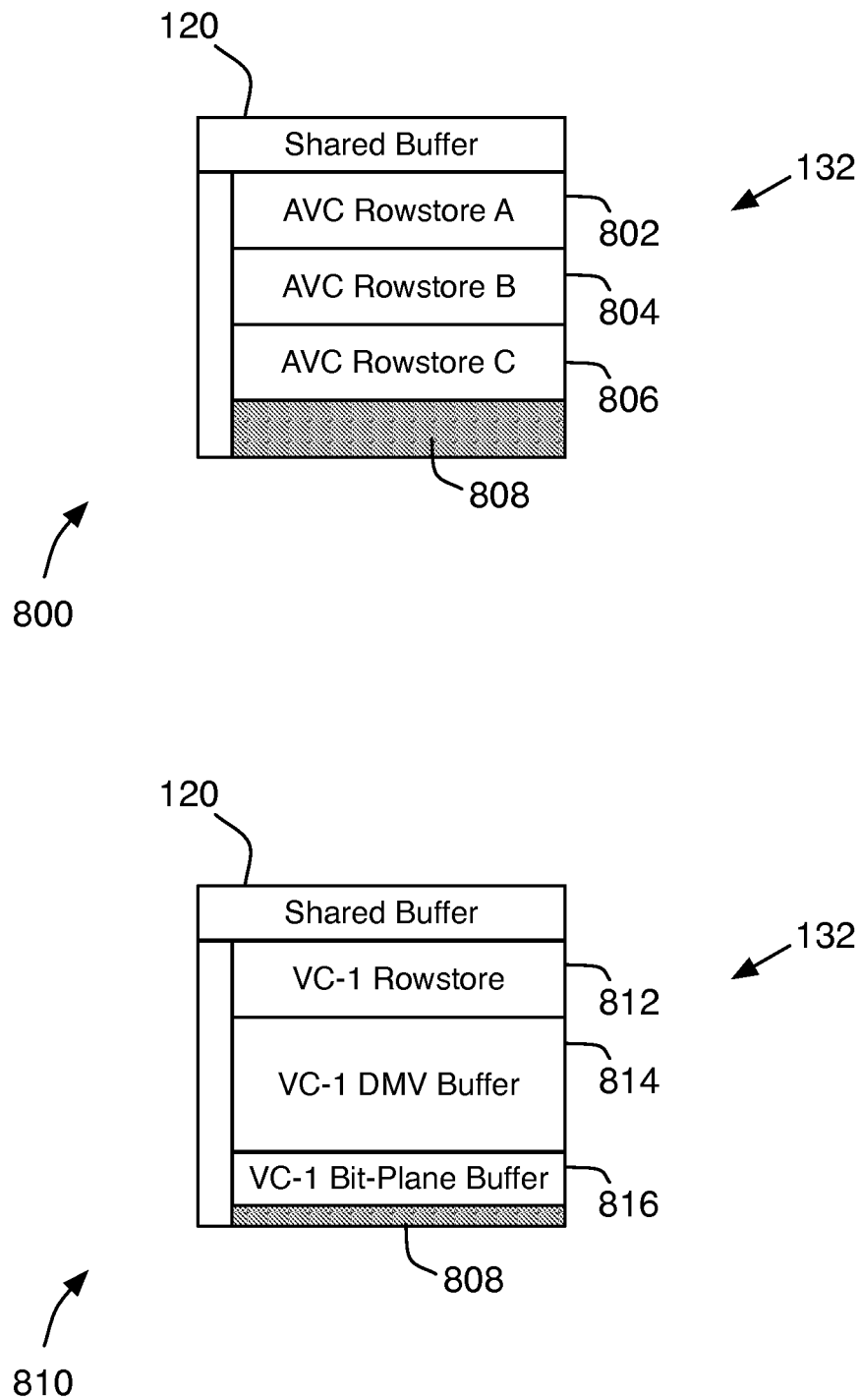
FIG. 8 illustrates additional example shared buffer configurations.

FIG. 8 illustrates an example initial configuration 800 of shared buffer 120 that may have been undertaken at block 202 of FIG. 2, and an example reconfiguration 810 of shared buffer 120 that may be undertaken at block 220 of FIG. 7. In the example of FIG. 8, shared buffer 120 may have been configured at block 202 (FIG. 2) to include three similarly sized rowstore buffers 802, 804 and 806 configured to conform with an AVC decoder implementing rowstore operations. In this non-limiting example, shared buffer 120 has a predetermined overall size such that, when configured to provide buffers 802, 804 and 806, shared buffer 102 includes an additional region 808 that has not been specifically formatted or configured at block 202.

In the example of FIG. 8, block 220 may involve dynamically reconfiguring shared buffer 120 to no longer include buffers 802, 804 and 806 but, rather, to include newly configured regions corresponding to regions suitable for a rowstore buffer 812, a DMV buffer 814 and bit-plane buffer 816 suitable for an VC-1 decoder implementing corresponding read stream processes. After reconfiguration at block 220, region 808 that has not been specifically formatted may still be present but may have a different size than found in configuration 800 depending on the sizes of the newly configured buffers 812, 814, and 816.

Returning to FIG. 7, subsequent to any reconfiguration at block 220, process 200 may continue with the receipt of a memory request for a second read stream (block 222), the determination of a buffer write address for that memory request (block 224), the writing of pixel data to the shared buffer for that second read stream (block 226), and the reading of that pixel data from the shared buffer at block 228. Blocks 222, 224, 226 and 228 may be undertaken in a similar manner as described above for blocks 204, 206, 208 and 210, respectively, of FIG. 2.

Process 200 may continue at block 230 where a determination may be made as to whether processing of the second read stream is to continue. For example, in various implementations, a video decoder may have undertaken a first iteration of blocks 222-228 as an initial portion of obtaining pixel data for a read stream process. The video decoder may then undertake one or more additional iterations of blocks 222-228 to obtain additional portion(s) of pixel data for the read stream process. Hence, if the decoder determines at block 230 that further processing of the first read stream is to continue, then the decoder may act to modify the memory address at block 232 (e.g., by incrementing the Mem_Addr signal value) before undertaking another iteration of blocks 222-230. In various implementations, a video decoder process may continue looping through blocks 222-232 until, at a final instance of block 230, the decoder determines that processing for the second read stream has ended. For example, a VC-1 decoder undertaking process 200 as shown in FIG. 7 may determine at a final instance of block 230 that processing of a second read stream should not continue and hence process 200 should end.

While the implementation of example process 300, as illustrated in FIGS. 2 and 7, may include the undertaking of all of blocks 202-232 in the order illustrated, claimed subject matter is not limited in this regard and, in various examples, implementation of process 200 may include the undertaking only a subset of blocks 202-232 and/or in a different order than illustrated.

Any one or more of the processes and/or blocks of FIGS. 2 and 7 may be undertaken in response to instructions provided by one or more computer program products. Such program products may include signal bearing media providing instructions that, when executed by, for example, one or more processor cores, may provide the functionality described above with respect to FIGS. 1-8. The computer program products may be provided in any form of computer readable medium. Thus, for example, a processor including one or more processor core(s) may undertake one or more of the blocks shown in FIGS. 2 and 7 in response to instructions conveyed to the processor by a computer readable medium.

Figure 9:
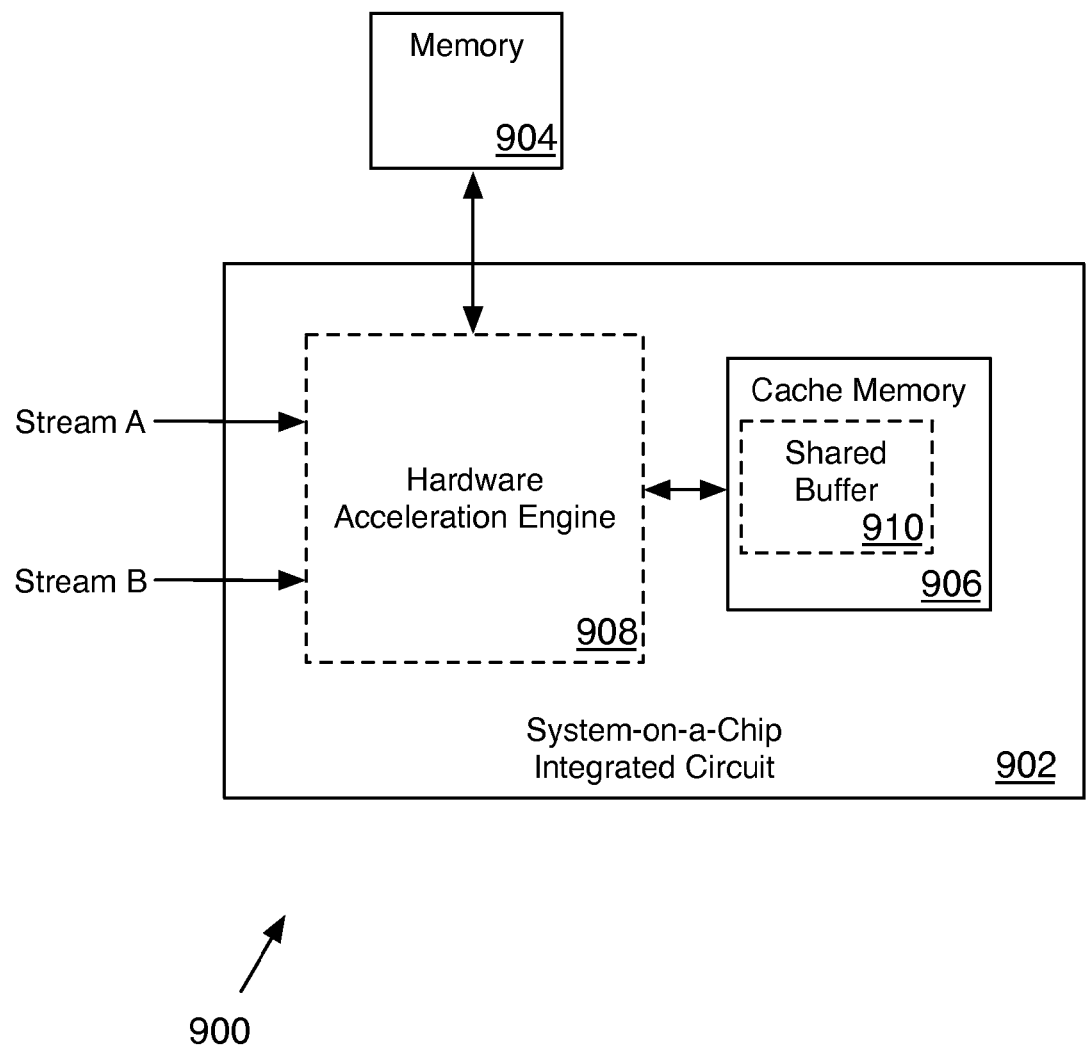
FIG. 9 is an illustrative diagram of an example system.

FIG. 9 illustrates an example system 900 in accordance with the present disclosure. System 900 may be used to perform some or all of the various functions discussed herein and may include any device or collection of devices capable of providing configurable buffer allocation for multi-format video processing in accordance with various implementations of the present disclosure. System 900 may include a Very Large Scale Integration (VLSI) System-on-a-Chip (SoC) integrated circuit (IC) 902 and external memory 904 communicatively and/or operably coupled to IC 902. IC 902 may include one or more processor cores (not shown) and may be any type of processor-based system including one or more processor cores such as, but not limited to, complex instruction set computer (CISC) microprocessor cores, reduced instruction set computing (RISC) microprocessor cores, very long instruction word (VLIW) microprocessor cores, one or more processor cores implementing any combination of instruction sets, or any other processor device, such as a digital signal processor or microcontroller. For example, IC 902 may include multiple processor cores and may be implemented in a consumer electronic (CE) device such as a mobile computing device (e.g., smartphone, tablet computer, or the like). Memory 904 may be any type of memory including, but not limited to, DRAM memory, SRAM memory, flash memory, or the like.

IC 902 may include internal memory 906, such as cache memory, and may provide and/or support a video hardware acceleration engine (HAE) 908 that may include logic configured to provide and/or undertake the various structures, operations, functions and/or actions as described herein. Video HAE 908 may do so in conjunction with a dynamically configurable shared buffer 910 as described herein. As described previously and as shown in FIG. 9, buffer 910 may be configured from at least a portion of internal memory 906. In various implementations, system 100 of FIG. 1, may be provided, at least in part, by video HAE 908 and shared buffer 910. Further, video HAE 908 in conjunction with shared buffer 910 may undertake any of the blocks of FIGS. 2 and 7 as described herein in response to differently formatted streams A and B of video data provided to IC 902. Video HAE 908 may adjust pre-fetch buffer size in response to a codec mode of operation and/or a type of video stream currently being processed.

Figure 10:
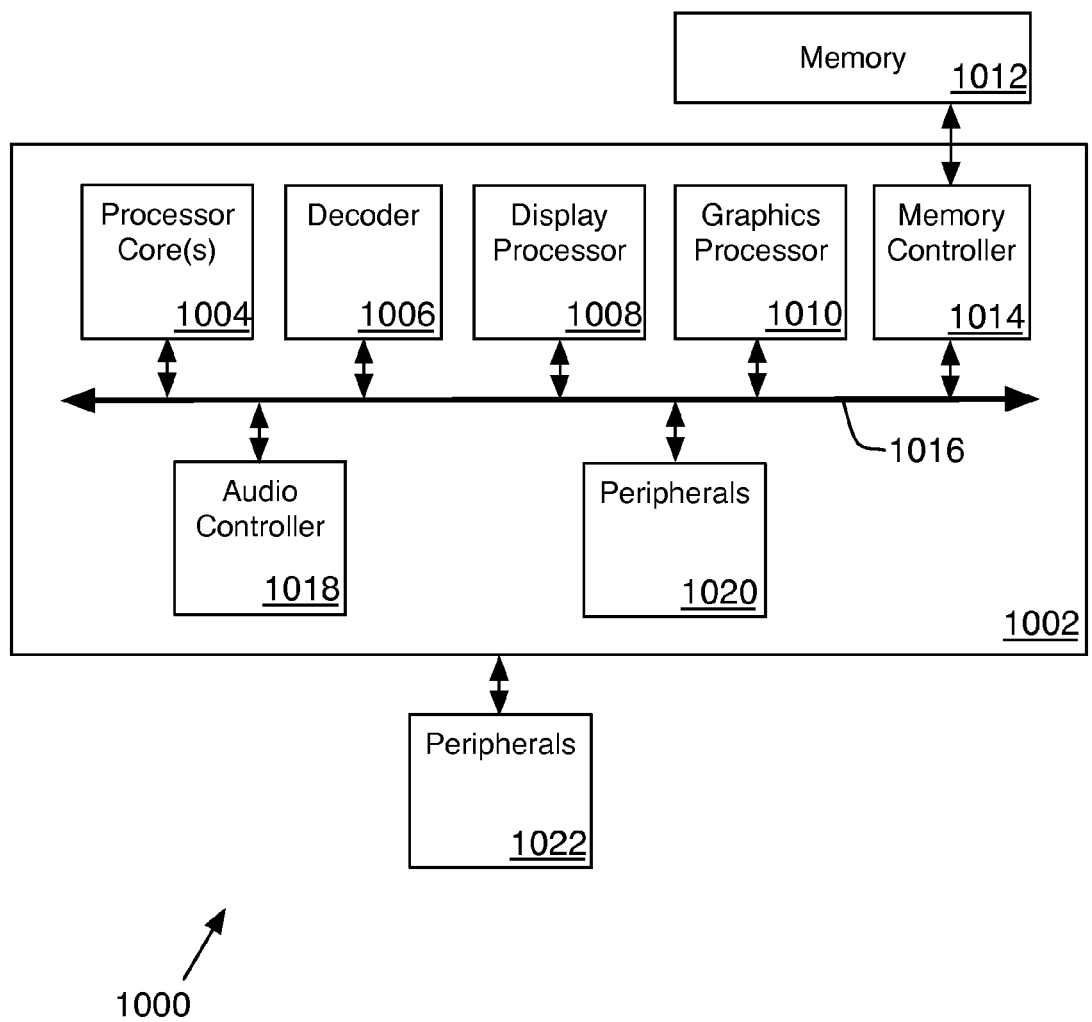
FIG. 10 is an illustrative diagram of an example system, all arranged in accordance with at least some implementations of the present disclosure.

FIG. 10 illustrates an example system 1000 in accordance with the present disclosure. System 1000 may be used to perform some or all of the various functions discussed herein and may include any device or collection of devices capable of undertaking configurable buffer allocation for multi-format video processing in accordance with various implementations of the present disclosure. For example, system 1000 may include selected components of a computing platform or device such as a desktop, mobile or tablet computer, a smart phone, a set top box, etc., although the present disclosure is not limited in this regard. In some implementations, system 1000 may be a computing platform or SoC based on Intel® architecture (IA) for CE devices. It will be readily appreciated by one of skill in the art that the implementations described herein can be used with alternative processing systems without departure from the scope of the present disclosure.

System 1000 includes a processor 1002 having one or more processor cores 1004. Processor cores 1004 may be any type of processor logic capable at least in part of executing software and/or processing data signals. In various examples, processor cores 1004 may include CISC processor cores, RISC microprocessor cores, VLIW microprocessor cores, and/or any number of processor cores implementing any combination of instruction sets, or any other processor devices, such as a digital signal processor or microcontroller.

Processor 1002 also includes a decoder 1006 that may be used for decoding instructions received by, e.g., a display processor 1008 and/or a graphics processor 1010, into control signals and/or microcode entry points. While illustrated in system 1000 as components distinct from core(s) 1004, those of skill in the art may recognize that one or more of core(s) 1004 may implement decoder 1006, display processor 1008 and/or graphics processor 1010. In some implementations, decoder 1006 may be a video decoder configured to undertake any of the processes described herein including the example processes described with respect to FIGS. 1-9. Further, in response to control signals and/or microcode entry points, display processor 1008 and/or graphics processor 1010 may perform corresponding operations.

Processing core(s) 1004, decoder 1006, display processor 1008 and/or graphics processor 1010 may be communicatively and/or operably coupled through a system interconnect 1016 with each other and/or with various other system devices, which may include but are not limited to, for example, a memory controller 1014, an audio controller 1018 and/or peripherals 1020. Peripherals 1020 may include, for example, a unified serial bus (USB) host port, a Peripheral Component Interconnect (PCI) Express port, a Serial Peripheral Interface (SPI) interface, an expansion bus, and/or other peripherals. While FIG. 10 illustrates memory controller 1014 as being coupled to decoder 1006 and the processors 1008 and 1010 by interconnect 1016, in various implementations, memory controller 1014 may be directly coupled to decoder 1006, display processor 1008 and/or graphics processor 1010.

In some implementations, system 1000 may communicate with various I/O devices not shown in FIG. 10 via an I/O bus (also not shown). Such I/O devices may include but are not limited to, for example, a universal asynchronous receiver/transmitter (UART) device, a USB device, an I/O expansion interface or other I/O devices. In various implementations, system 1000 may represent at least portions of a system for undertaking mobile, network and/or wireless communications.

System 1000 may further include memory 1012. Memory 1012 may be one or more discrete memory components such as a dynamic random access memory (DRAM) device, a static random access memory (SRAM) device, flash memory device, or other memory devices. While FIG. 10 illustrates memory 1012 as being external to processor 1002, in various implementations, memory 1012 may be internal to processor 1002. Memory 1012 may store instructions and/or data represented by data signals that may be executed by the processor 1002. In some implementations, memory 1012 may include a system memory portion and a display memory portion.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A method, comprising:
    at a processor,
    configuring a shared buffer to support processing of a first read stream and a second read stream, wherein the first read stream is associated with a first video codec format, and wherein the second read stream is associated with a second video codec format different than the first video codec format;
    determining a first buffer write address within the shared buffer in response to a memory request associated with the first read stream; and
    determining a second buffer write address within the shared buffer in response to a memory request associated with the second read stream, wherein the second buffer write address is different than the first buffer write address,
    wherein configuring the shared buffer to support processing of the first read stream and the second read stream comprises configuring the shared buffer in response to configuration data, wherein the configuration data was provided by a first software driver associated with the first read stream and by a second software driver associated with the second read stream.

2. The method of claim 1, further comprising:
    writing pixel data to the first buffer write address; and
    reading the pixel data from the shared buffer.

3. The method of claim 2, further comprising:
    writing second pixel data to the second buffer write address; and
    reading the second pixel data from the shared buffer.

4. The method of claim 1, wherein the shared buffer comprises a pre-fetch buffer.

5. The method of claim 1, wherein the shared buffer comprises cache memory.

6. The method of claim 1, wherein the configuration data specifies the first buffer write address and the second buffer write address.

7. A method, comprising:
    at a processor,
    configuring a shared buffer to support processing of a first read stream, wherein the first read stream is associated with a first video codec format;
    determining a first buffer write address within the shared buffer in response to a memory request associated with the first read stream;
    reconfiguring the shared buffer to support processing of a second read stream, wherein the second read stream is associated with a second video codec format; and
    determining a second buffer write address within the shared buffer in response to a memory request associated with the second read stream,
    wherein configuring the shared buffer to support processing of the first read stream comprises configuring the shared buffer in response to first configuration data provided by a software driver associated with the first read stream, and wherein reconfiguring the shared buffer to support processing of the second read stream comprises configuring the shared buffer in response to second configuration data provided by a software driver associated with the second read stream.

8. The method of claim 7, further comprising before reconfiguring the shared buffer to support processing of the second read stream:
    writing pixel data to the first buffer write address; and
    reading the pixel data from the shared buffer.

9. The method of claim 8, further comprising after reconfiguring the shared buffer to support processing of the second read stream:
    writing second pixel data to the second buffer write address; and
    reading the second pixel data from the shared buffer.

10. The method of claim 7, wherein the shared buffer comprises a pre-fetch buffer.

11. The method of claim 7, wherein the shared buffer comprises cache memory.

12. The method of claim 7, wherein the first configuration data specifies the first buffer write address, and wherein the second configuration data specifies the second buffer write address.

13. A system, comprising:
an integrated circuit (IC) including internal memory, the IC further including logic configured to:
  configure a shared buffer within the internal memory to support processing of a first read stream, wherein the first read stream is associated with a first video codec format;
  determine a first buffer write address within the shared buffer in response to a memory request associated with the first read stream;
  reconfigure the shared buffer to support processing of a second read stream, wherein the second read stream is associated with a second video codec format; and
  determine a second buffer write address within the shared buffer in response to a memory request associated with the second read stream,
wherein the IC further includes one or more registers to store first configuration data associated with the first read stream, and to store second configuration data associated with the second read stream.

14. The system of claim 13, further comprising:
external memory coupled to the IC, the external memory to store first pixel data and second pixel data, wherein the first pixel data is associated with the first read stream, and wherein the second pixel data is associated with the second read stream.

15. The system of claim 14, wherein the logic is further configured to:
write the first pixel data to the first buffer write address; and
write the second pixel data to the second buffer write address.

16. The system of claim 13, wherein the logic is further configured to:
configure the shared buffer in response to the first configuration data; and
reconfigure the shared buffer in response to the second configuration data.

17. The system of claim 13, wherein the shared buffer comprises a pre-fetch buffer.

18. The system of claim 13, wherein the internal memory comprises cache memory.

19. A non-transitory article comprising a computer program product having stored therein instructions that, if executed, result in:
at a processor,
  configuring a shared buffer to support processing of a first read stream and a second read stream, wherein the first read stream is associated with a first video codec format, and wherein the second read stream is associated with a second video codec format different than the first video codec format;
  determining a first buffer write address within the shared buffer in response to a memory request associated with the first read stream; and
  determining a second buffer write address within the shared buffer in response to a memory request associated with the second read stream, wherein the second buffer write address is different than the first buffer write address,
wherein instructions for configuring the shared buffer to support processing of the first read stream and the second read stream includes instructions for configuring the shared buffer in response to configuration data, wherein the configuration data was provided by a first software driver associated with the first read stream and by a second software driver associated with the second read stream.

20. The non-transitory article of claim 19, further having stored therein instructions that, if executed, result in:
writing pixel data to the first buffer write address; and
reading the pixel data from the shared buffer.

21. The non-transitory article of claim 20, further having stored therein instructions that, if executed, result in:
writing second pixel data to the second buffer write address; and
reading the second pixel data from the shared buffer.

22. The non-transitory article of claim 19, wherein the shared buffer comprises a pre-fetch buffer.

23. The non-transitory article of claim 19, wherein the shared buffer comprises cache memory.

24. The non-transitory article of claim 19, wherein the configuration data specifies the first buffer write address and the second buffer write address.

* * * * *